(12) United States Patent
Beall et al.

(10) Patent No.: US 6,319,870 B1
(45) Date of Patent: Nov. 20, 2001

(54) FABRICATION OF LOW THERMAL EXPANSION, HIGH STRENGTH CORDIERITE STRUCTURES

(75) Inventors: Douglas M. Beall, Painted Post; Martin J. Murtagh, Trumansburg, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/443,758

(22) Filed: Nov. 19, 1999

Related U.S. Application Data

(60) Provisional application No. 60/109,408, filed on Nov. 20, 1998.

(51) Int. Cl.$^7$ ............... C04B 35/111; C04B 35/18; C04B 35/185; C04B 35/195; C04B 35/20
(52) U.S. Cl. ............... 501/119; 501/120; 501/121; 501/122; 501/128; 501/133; 501/153; 501/154; 428/116
(58) Field of Search ............... 501/119, 120, 501/121, 122, 128, 133, 153, 154

(56) References Cited

U.S. PATENT DOCUMENTS

| | | |
|---|---|---|
| 3,885,977 | 5/1975 | Lachman et al. . |
| 4,033,779 * | 7/1977 | Winkler . |
| 4,280,845 | 7/1981 | Matsuhisa et al. . |
| 4,295,892 * | 10/1981 | Matsuhisa et al. ............ 501/120 |
| 4,316,965 | 2/1982 | Oda et al. . |
| 4,434,117 | 2/1984 | Inoguchi et al. . |
| 4,745,092 | 5/1988 | Prunier, Jr. . |
| 4,772,580 | 9/1988 | Hamanaka et al. . |
| 4,810,681 | 3/1989 | Hayakawa . |
| 4,869,944 | 9/1989 | Harada et al. . |
| 4,877,670 | 10/1989 | Hamanaka . |
| 4,950,628 | 8/1990 | Landon et al. . |
| 5,030,398 | 7/1991 | Hamanaka et al. . |
| 5,114,643 | 5/1992 | Beall et al. . |
| 5,114,644 | 5/1992 | Beall et al. . |
| 5,141,686 | 8/1992 | Murtagh . |
| 5,258,150 | 11/1993 | Merkel et al. . |
| 5,270,270 | 12/1993 | Semar et al. . |
| 5,281,462 | 1/1994 | Day et al. . |
| 5,332,703 | 7/1994 | Hickman . |
| 6,004,501 * | 12/1999 | Cornelius et al. ............ 264/631 |
| 6,048,490 * | 4/2000 | Cornelius et al. ............ 264/631 |

FOREIGN PATENT DOCUMENTS 0 894 776 of 1999 (EP) .
1 497 379 * 1/1978 (GB) .

OTHER PUBLICATIONS

O'Bannon, Dictionary of Ceramic Science and Engineering, p. 73, 1984.*

* cited by examiner

Primary Examiner—David R. Sample
(74) Attorney, Agent, or Firm—Timothy M. Schaeberle

(57) ABSTRACT

The present invention is directed at sintered ceramic articles exhibiting a crystalline phase assemblage comprising, by weight, of 65–95% cordierite and 5–35% of a secondary phase selected from the group consisting of mullite, magnesium-aluminate spinel, and sapphirine and having a bulk analytical composition consisting essentially of about, by weight, 32–51% $SiO_2$, 35–49% $Al_2O_3$, 7–16% MgO. Furthermore, the ceramic articles exhibit an effective strength of greater than about 3000, a CTE of less than about $15 \times 10^{-7}$/° C., over the temperature range of 25° C., to 1000° C., and a total intrusion porosity, as measured by a Hg intrusion method, of at least 20%. This invention also relates to a method for producing a sintered ceramic article having the aforementioned cordierite and secondary minor phase mixture.

7 Claims, 1 Drawing Sheet

FABRICATION OF LOW THERMAL EXPANSION, HIGH STRENGTH CORDIERITE STRUCTURES

This application claims the benefit of U.S. Provisional Application No. 60/109,408, filed Nov. 20, 1998, entitled "Fabrication of Low Thermal Expansion, High Strength Cordierite Structures", by Beall et al.

BACKGROUND OF THE INVENTION

1. Field of the Invention

The invention relates to cordierite ceramic bodies for use as catalyst carriers, particularly to cordierite bodies of high strength, low thermal expansion and high porosity for use as catalyst carriers for purifying automobile exhaust gas, and a method for producing the cordierite bodies.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides ($NO_x$) and carbon monoxide (CO). The automotive industry has for many years attempted to reduce the quantities of gaseous emissions from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to high thermal shock resistance of cordierite ceramics. The thermal shock resistance is inversely proportional to the coefficient of thermal expansion. That is, honeycombs with a low thermal expansion have a good thermal shock resistance and can survive the wide temperature fluctuations that are encountered the application.

The production of cordierite ($2MgO.2Al_2O_3.5SiO_2$) ceramics from mineral batches containing sources of magnesium, alumina and silica such as clay and talc is well known. Such processes are described in U.S. Pat. No. 2,684,919. The manufacture of thermal-shock-resistant cordierite honeycomb ceramics from clay/talc batches by extruding the batches and firing the extrudate to provide ceramics with very low expansion coefficients along, at least one axis, is disclosed in U.S. Pat. No. 3,885,977.

Manufacturers work continuously to optimize the characteristics of cordierite substrates to enhance their utility as catalyst carriers. Specifically, manufacturers continually strive to optimize the thermal shock resistance and strength of the cordierite substrates. The following patents each relate to the manufacture of ceramic honeycombs exhibiting improved thermal shock resistance or coefficient of thermal expansion (CTE) and/or strength.

U.S. Pat. No. 5,144,643 (Beall et al.) discloses the method of fabricating a cordierite body having at having 12 to 16%, by weight MgO, 35–41% $Al_2O_3$ and 43–53% $SiO_2$. Furthermore, the body comprises least 90%, by weight, cordierite and a coefficient of thermal expansion less than about $9 \times 10^{-7}/°$ C. from about 25 to about 1000° C. The method involves selecting specific raw materials that will form the desired cordierite body. Specifically, these raw material selections should not include any clay or talc, should include a MgO-yielding component and an $Al_2O_3$- yielding component having a particle size of no greater than 15 and 8 micrometers, respectively. The raw materials are mixed together, subsequently dried and fired for a time and a temperature sufficient to form the aforementioned cordierite body. Given the low CTE and the degree of microcracking likely at these CTE values, the cordierite bodies disclosed herein are relatively weak.

U.S. Pat. No. 5,332,703 (Hickman) discloses a ceramic product consisting essentially of cordierite and the method for making the same. Specifically, the ceramic body is comprised of at least 90%, by weight, cordierite, exhibits an MOR of at least 3500 psi, a total porosity not exceeding about 20%, by volume, and a CTE not exceeding about $4.8 \times 10^{-7}/°$ C. from about RT to about 800° C. The method for producing the aforementioned ceramic articles involves employing a combination batch comprising a mineral component and a chemical component. The mineral batch component comprises clay and talc while the chemical component consists essentially of powdered oxides, hydroxides, or hydrous oxides of magnesium, aluminum and silicon. The raw material batch combination is mixed, formed, dried and thereafter fired to result in the formation of the ceramic body. Although the Hickman reference exhibits the desired combination of low CTE and relatively high strength it does so at the expense of a reduction in the porosity. This porosity tradeoff is unacceptable, given that a high porosity is important in the production of honeycomb catalyst carrier substrates, specifically it is needed for the proper application of high surface area washcoats.

While such ceramics represent an improvement in properties over extruded cordierite ceramics produced using more conventional processes, still further improvements in these products, particularly with respect to strength, without a reduction in porosity and an unacceptable increase in thermal expansion would be desirable. Strength has become an increasingly important consideration in production of cordierite honeycomb substrates as a result of the move to producing thinner-walled, higher cell density, increased catalytic conversion efficiency and lower back pressure-producing cordierite honeycombs catalyst carriers. Put differently, there is a move towards increasing the intrinsic material strength of the honeycomb substrates in order to compensate for the loss in strength resulting from the move toward decreasing the honeycomb substrate web strength.

It is therefore a principal object of the present invention to provide improved cordierite ceramics, and method for making them, such that the ceramics exhibit higher strength in combination with inherent low thermal expansion and high overall porosity.

SUMMARY OF THE INVENTION

The object of the present invention is to solve the above problems of the prior art and to provide a sintered ceramic substrate, and method for making said ceramic substrate, having a primary crystalline phase comprising cordierite and a secondary reinforcing crystalline phase.

It has been surprisingly found that the formation of a cordierite ceramic having a composition that is deliberately removed from stoichiometric produces a sintered ceramic exhibiting a novel combination of increased strength for a given porosity and a low coefficient of thermal expansion. The properties are obtained through the generation of a dispersed reinforcing/secondary crystalline assemblage comprising mullite and/or sapphirine and/or magnesium aluminate spinel.

Specifically, the sintered ceramic article of the invention body exhibits a crystalline phase assemblage comprising, by weight, of 65–95% cordierite and 5–35% of a secondary phase selected from the group consisting of mullite, magnesium-aluminate spinel, and sapphirine and a bulk analytical composition consisting essentially of about, by weight, 32–51% $SiO_2$, 35–49% $Al_2O_3$, 7–16% MgO. Furthermore, the ceramic article exhibits an effective strength of greater than about 3000, a CTE of less than about $15\times10^{-7}/°$ C., over the temperature range of 25° C. to 1000° C., and a total intrusion porosity, as measured by a Hg intrusion method, of at least 20%.

This invention also relates to a method for producing a sintered ceramic article, having the crystalline cordierite and secondary minor phase mixture, comprising preparing a plasticizable raw material mixture comprising a $SiO_2$-yielding, an $Al_2O_3$-yielding and a MgO-yielding component, adding an organic binder system to the mixture and mixing the mixture to form an extrudable mixture, and thereafter extruding the mixture to form a substrate of the desired configuration. The green body is dried and fired for a time and at temperature sufficient to form a sintered mixed crystalline phase structure having a unique combination of increased strength, low CTE and high total porosity.

DETAILED DESCRIPTION OF THE INVENTION

Figure 1:
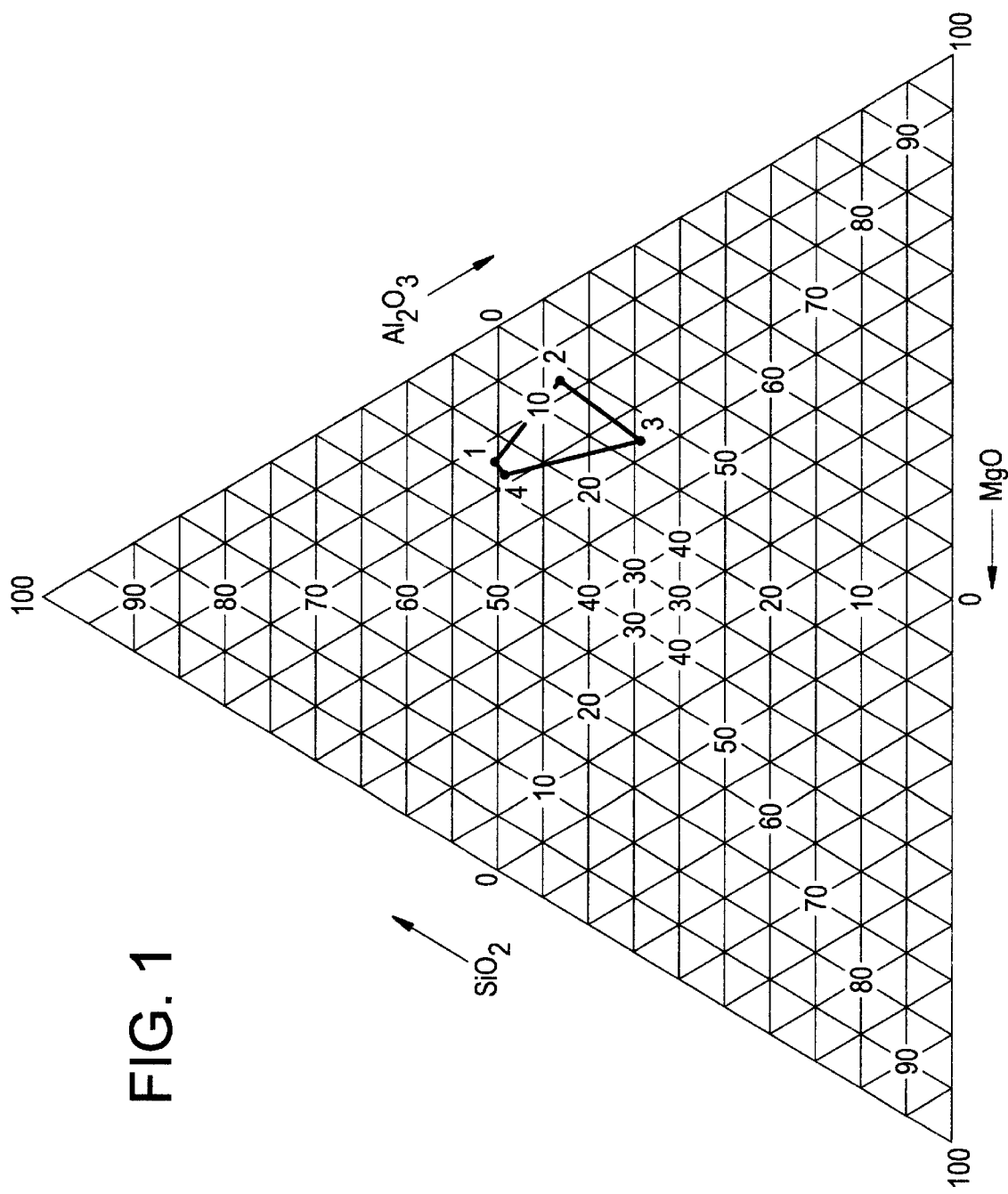
FIG. 1 is a ternary phase diagram of the $SiO_2$—$Al_2O_3$—MgO system showing the desired composition region of the present invention.

The present invention relates to ceramic articles that exhibit a combination of high strength, high thermal shock resistance and high porosity and which exhibit a crystalline phase assemblage comprising a major cordierite crystalline phase and a minor secondary crystalline phase. Furthermore, the present invention relates to a method of producing these articles using an optimized combination of raw materials, both type and amount, capable of forming MgO, $Al_2O_3$ and $SiO_2$-containing ceramic bodies which exhibit the crystal phase combination of cordierite and the secondary crystal phase.

It has been discovered when the oxide relationship between the three ternary end members $SiO_2$, $Al_2O_3$, MgO is carefully controlled though the composition of the raw materials, an off-stoichiometric cordierite-containing composition region can be obtained. The inventive, fired ceramic articles, having a narrowly defined composition exhibiting a secondary crystalline phase lie within this ternary region. Specifically, the inventive ceramic articles have a sintered crystalline phase composition, by weight, as determined by X-ray diffraction, of 65–95% cordierite and 5–35% of a secondary phase selected from the group consisting of mullite, magnesium-aluminate spinel, and sapphirine. Preferably, the bodies comprise at least about 70% by weight cordierite. The raw material types and the relative amounts of each are selected to form the mixed phase ceramic article having a bulk analytical composition consisting essentially of about, by weight, 32–51% $SiO_2$, 35–49% $Al_2O_3$, 7–16% MgO. The area of FIG. 1 designated 1-2-3-4 represents this off-stoichiometric composition range.

Further, it has been discovered that in order to achieve this low thermal expansion, high strength, high porosity property combination, an optimized combination of specific raw materials (i.e., raw materials of a certain particle size and morphology), and a specific firing schedule must be utilized so as to achieve the desired properties. In other words, although certain raw materials when combined together would fall within the above composition range and produce the proper mixed major/minor phase ceramic body, the properties of the ceramic body may not be within the desired values. Put differently, given their influence on the final thermal expansion, porosity and strength properties, it is not only sufficient to control the final stoichiometry of the fired body through the composition choice, it is also necessary to choose specific combinations of raw material types and the firing schedules utilized in the production of the ceramic bodies.

As previously mentioned, it has been found that by utilizing certain silica, magnesia and alumina yielding components in the raw material batch, the mixture described herein results in sintered ceramic articles, characterized by a mixed crystalline phase of cordierite and a secondary reinforcing phase selected from the group consisting of mullite, sapphirine and magnesium aluminate, having a property combination of an increased strength for a given porosity and low thermal expansion. Specifically, the ceramic bodies of the present invention are characterized by a low CTE, that is, a CTE of less than about $15\times10^{-7}$° $C.^{-1}$ at 25° C. to 1000° and most advantageously no greater than about $10\times10^{-7}$° C. at 25° C. to 1000° C. The bodies of the present invention are additionally characterized by a relatively high porosity, that is, a total porosity of greater than about 20%, as measured by Hg porosimetry. The upper limit of porosity is determined by practical considerations. However, the total porosity is most typically about 25% to about 40%, as measured by Hg porosimetry.

Furthermore, the inventive bodies exhibit an effective strength of at least greater than 3000, a value exhibited by prior art standard commercially available ceramic bodies exhibiting primary crystalline phase (i.e., greater than 90%, by weight) of cordierite. The effective strength (ES) is defined by the equation ES=MOR+403(MPS−2.3)+41(TP−31), wherein MOR is the modulus of rupture, MPS is median pore size and TP is the total porosity as measured by Hg porosimetry. This effective strength is a measure of strength that normalizes the effects of porosity and median pore size on the strength and enables the comparison of the relative strengths of the ceramic bodies having varying median pore sizes and porosities.

In accordance with the present invention, provided is a plasticizable raw material mixture for use in preparing the ceramic article above with the mixture comprising a $SiO_2$-yielding component, an $Al_2O_3$-yielding component and a MgO-yielding component. It must be empirically determined which combination of $Al_2O_3$-yielding, $SiO_2$ yielding and MgO-yielding raw material components will not only fall within the narrow off-stoichiometric composition range defined above, but result in ceramic bodies which possess the requisite low CTE, high strength and high overall porosity properties.

Clay can be used in the raw material mixture as a source of either $SiO_2$ and/or $Al_2O_3$, although it is not required that the raw material mixture be comprised of any clay. Particular clays that are acceptable for use in the instant invention include both raw and calcined, laminated and delaminated kaolins. A preferred type of clay is delaminated kaolin having a fine particle size and exhibiting a BET surface area of between about 7 to 15 $m^2/g$. The use of delaminated clays that exhibit more of an oriented structure function to aid in attaining a relatively low CTE of the resultant ceramic article.

The $Al_2O_3$-yielding component can be simply aluminum oxide or any material that, when fired, forms aluminum oxide. Additional, acceptable alumina yielding-components include, alumina, aluminum hydroxide, aluminum oxyhydrate, as well as combinations of these. A particularly preferred $Al_2O_3$-yielding component includes a highly reactive alumina having an average particle size of less than 8 µm in diameter, and preferably a particle size of about one micron or less. This fine particle size alumina functions, like the delaminated kaolin, to aid in attaining ceramic article exhibiting a relatively low CTE.

The MgO-yielding component can simply comprise a calcined magnesium oxide, as well as magnesium hydroxide, magnesium carbonate, magnesium nitrate and combinations of these. In a preferred embodiment, the MgO source is a calcined or uncalcined coarse talc having an average particle diameter of between about 1 to 15 microns and having a surface area of between about 1 $m^2/g$ to 15 $m^2/g$, and more preferably a surface area of between about 3 $m^2/g$ to 8 $m^2/g$; uncalcined talc being the more preferred source. Additionally, it is preferred that the talc be platy, in other words, the talc should exhibit a platelet particle morphology, that is, particles having two long dimensions and one short dimension, or, a length and width of the platelet that is much larger than its thickness. It is preferred that the talc possesses a morphology index between about 0.65 to 0.85. The morphology index, as first described in U.S. Pat. No. 5,141,685, is a measure of the degree of platiness of the talc. One typical procedure for measuring the morphology index is to place the sample in a holder so that the orientation of the platy talc is maximized within the plane of the sample holder. The x-ray diffraction pattern is then determined for this oriented talc. The morphology index semi-quantitatively relates the platy character of the talc to its XRD peak intensities using the following equation:

$$M=I_x(I_x+2I_y)^{-1}$$

where $I_x$ is the intensity of the (004) peak and $I_y$ is that of the (020) reflection. It should be noted that the selection of a talc that is too platy likely results in ceramic articles, which although possessing a low CTE, possess an undesirable strength. Put differently, a talc should be selected which possesses a degree of platiness, i.e., a morphology index between about 0.65 to 0.85, which functions to lower the ceramic article CTE without a too great a reduction in the strength of the ceramic article.

Excellent properties have been obtained by preparing a sintered multi-phase ceramic article from a raw material mixture comprising delaminated kaolin (average particle diameter approximately 1.5 µm), talc (morphology index of 0.75 and BET surface area of about 5–8 $m^2/g$) and fine reactive alumina (average particle diameter of approximately 0.5 µm).

The aforementioned raw materials of which the plasticized mixture is comprised are combined in a mixing step sufficient to produce an intimate mixing of the raw material phases to allow complete reaction in thermal processing. In order to create an extrudable mixture that is formable and moldable, a binder system is added at this point. A preferred binder system for use in the present invention comprises a cellulose ether binder component selected from the group consisting of methylcellulose, methylcellulose derivatives, and combinations thereof, a surfactant component, preferably stearic acid or sodium stearate, and a solvent comprising water. Assuming 100 parts by weight of the inorganic raw material mixture, an excellent binder system for use in the instant invention comprises the following amounts: about 0.2 to 2 parts by weight of the sodium stearate, about 2.5 to 6.0 parts by weight of a methylcellulose or a hydroxypropyl methylcellulose binder, and about 8 to 30 parts by weight of the water.

The individual components of the binder system are mixed with a mass of the inorganic powder material, e.g., the $SiO_2$, $Al_2O_3$, MgO yielding components, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a thin-walled honeycomb substrate suitable for use as a catalyst support, extrusion through a die, is preferable.

The prepared ceramic green body is then dried for a period of about 5–20 minutes prior to firing by any conventional method such as hot-air drying or dielectric drying.

As mentioned above, it is not only critical to obtain the proper $SiO_2$, $Al_2O_3$ and MgO stoichiometric ratios of the fired body through the utilizing the proper amount of the raw materials, but it is imperative to utilize a firing schedule in the production that results in the desired low thermal expansion and high porosity and strength properties. As before, in the raw material selection, the actual firing schedule utilized for each raw material mixture must be empirically determined. In other words, the actual firing schedule that will result in the aforementioned desired properties will vary depending upon the type and amount of raw materials utilized.

Once the appropriate firing scheduled has been determined, the dried green body is thereafter fired at the predetermined time and temperature determined to be sufficient to result in a fired ceramic body exhibiting the requisite low CTE, and high strength factor, and containing cordierite as its primary phase and containing a secondary phase selected from the group consisting of mullite, sapphirine and magnesium aluminate spinel. Although the firing condition is empirically determined and dependent upon the starting batch material and desired "sintered ceramic" properties, some preferred firing conditions are as follows:

heating the green body to a first temperature of about 600° C. to about 650° C. at a firing rate of about 5° C. to about 25° C. per hour, preferably about 18° C. per hour and thereafter from the first temperature to a second temperature of between about 1300° C. to about 1450° C. at a firing rate of about 10° C. to about 50° C. per hour, and preferably about 25° C. per hour, and holding at the third temperature for about 6 hours to about 16 hours, preferably about 10 hours, and thereafter cooling the green body to room temperature at a cooling rate of about 100° C. to about 200° C. per hour.

While not intending to be limited by theory, it is thought that the inventive mixed crystalline phase ceramic articles exhibiting the unique combination of high strength factor and low coefficient of thermal expansion possess this combination as a result of two general phenomena; a change in the makeup of the crystalline phase assemblage and change in microcracking. Both of these general phenomena come about as a result of the inclusion of the secondary mullite, sapphirine or spinel crystalline phase. Regarding one aspect of the crystalline phase assemblage change, it is theorized that the inclusion of the secondary phase may provide a composite/reinforcing effect resulting from the secondary phase providing reinforcement to the microstructure of the mixed phase ceramic article. Alternatively, the inclusion of the secondary phase may simply provide an additive or replacement effect to the existing cordierite crystalline structure. Regarding the second phenomena, the mullite, sapphirine and the spinel phases each exhibits a lesser degree of, and/or possibly a different type of, microcracking when compared to the cordierite crystalline phase and as a result the mixed phase ceramic articles exhibit a microcracking change that results in an increase in strength. Although the reduction in the degree, and/or the change in type, of microcracking increases the strength of the ceramic articles, it does however, slightly increase the CTE of the body, however the magnitude of the strength increase due to the combination of both phenomena is far greater than the increase of the CTE which still remains acceptably low; less than about $15 \times 10^{-7}/°$ C. Thus, a perceived advantage of the inventive bodies is ability to increase the strength of these cordierite bodies without an undesirable reduction in the porosity, which is contrary to that means typically used in prior art cordierite bodies for increasing strength.

As indicated previously, a primary utility of the mixtures described herein is for preparing high strength cordierite honeycomb substrates useful as catalyst carriers. Although the invention is particularly advantageous for preparing thin-walled honeycombs, the claimed mixtures can also be used for thicker walled structures. The mixtures may also be useful for preparing other high strength cordierite structures, as well, such as filters.

EXAMPLES

To further illustrate the principles of the invention of the present invention, there will be described several examples of the ceramic bodies formed according to the invention. However, it is to be understood that the examples are given for illustrative purpose only, and the invention is not limited thereto, but various modifications and changes may be made in the invention, without departing from the spirit of the invention.

Examples 1–11

Inorganic powder batch mixtures suitable for the formation of a ceramic body having cordierite as its primary crystalline phase are listed in TABLE I; as listed in percent by weight. The delaminated kaolin had an average particle diameter of approximately 1.5 $\mu$m, and the alumina utilized was a fine reactive alumina, which had an average particle diameter of approximately 0.8 $\mu$m. Regarding the talc raw materials, Talc 1 had a BET surface area of about 5–8 m$^2$/g and it exhibited a morphology index of 0.7, while Talc 2 possessed a higher degree of platiness and exhibited a morphology index of 0.95.

Each of compositions 1–11 was prepared by combining and dry mixing together the components of the designated inorganic mixture as listed in TABLE I. An amount of the organic binder system listed in TABLE I was then added to each of the inorganic dry mixtures and thereafter further mixed to form a plasticized ceramic batch mixture. Each of these 13 different plasticized ceramic batch mixtures comprised differing amounts of the binder system components, as detailed in TABLE I ranging from 30.15 to 33.15 parts by weight, based on 100 parts total inorganics.

Each of the various plasticized mixtures was extruded through an extruder under conditions suitable to form ¼ in. rods. The green ceramic rods formed from each of the 13 batch compositions were sufficiently dried to remove any water or liquid phases that might be present. and thereafter subjected to a heating and firing cycle sufficient to remove the organic binder system from, and to sinter, the honeycomb substrates. Specifically, the green substrates were fired were fired to between 1300 and 1450° C. and held for a period of about 10 hours; i.e., firing conditions suitable for forming ceramic bodies having cordierite as their primary phase and having either a mullite, sapphirine or magnesium aluminate spinel secondary phase.

Table I reports the ceramic body phase type and amounts, as measured by standard X-ray diffraction techniques, as well as the analytical oxide percentages, in weight percent of the anhydrous oxide end members. Additionally, Table I reports selected properties for the ceramics produced from the batches reported in the Table. Properties included for each of the ceramic bodies include, the modulus of rupture strength (MOR) of the rods, in psi, and the average coefficient of thermal expansion (CTE) of the ceramic rod over the temperature range from room temperature (25° C.) to 1000° C. ($\times 10^{-7}$° C.), the porosity, as measured by Hg porosimetry expressed in volume percent, and the calculated effective strength as detailed above.

TABLE I

|  | 1* | 2* | 3* | 4 | 5 | 6 | 7 | 8 | 9* | 10 | 11 |
|---|---|---|---|---|---|---|---|---|---|---|---|
| INORGANICS | | | | | | | | | | | |
| Talc 1 | 40.86 | — | 30.5 | 39.5 | 36.51 | 37.8 | 39.54 | 42.29 | 40.78 | 44.08 | 46.5 |
| Talc 2 | — | 39.5 | — | — | — | — | — | — | — | — | — |
| Calcined Clay | 32.6 | 31.85 | 33.2 | 31.85 | 31.79 | — | 29.2 | 25.86 | 26.48 | — | — |
| Raw Clay | 12.82 | 12.7 | 13.28 | 12.7 | 12.74 | — | 11.89 | 10.53 | 15.37 | — | — |
| Coarse Alumina | — | — | — | — | — | — | — | — | 15.35 | — | — |
| Fine α-alumina | 13.72 | 16.05 | 23.02 | 16.05 | 18.96 | 37.9 | 17.36 | 19.31 | — | 37.11 | 37.8 |
| Silica | — | — | — | — | — | 24.3 | 2.0 | 2.0 | 2.03 | 18.82 | 15.8 |

TABLE I-continued

|  | 1* | 2* | 3* | 4 | 5 | 6 | 7 | 8 | 9* | 10 | 11 |
|---|---|---|---|---|---|---|---|---|---|---|---|
| ORGANIC BINDER SYSTEM | | | | | | | | | | | |
| Methocel | 2.9 | 2.9 | 2.9 | 2.9 | 2.9 | 4.0 | 3.5 | 3.5 | 2.9 | 4.0 | 4.0 |
| Stearic Acid | 0.75 | 0.75 | 0.75 | 0.75 | 0.75 | 1.0 | 0.5 | 0.5 | 0.75 | 1.0 | 1.0 |
| Water | 29.0 | 26.5 | 28.0 | 28.5 | 28.0 | 26.0 | 21.5 | 20.0 | 29.5 | 26.0 | 26.0 |
| Oil | | | | | | | 6.0 | 6.0 | | | |
| OXIDE PERCENT | | | | | | | | | | | |
| SiO2 | 51.4 | 49.9 | 44.9 | 49.9 | 47.9 | 49.1 | 50.2 | 49.4 | 51.4 | 47.8 | 46.3 |
| Al2O3 | 35.0 | 37.0 | 45.0 | 37.0 | 40.0 | 38.6 | 36.7 | 36.6 | 35.0 | 37.9 | 38.6 |
| MgO | 13.6 | 13.1 | 10.1 | 13.1 | 12.1 | 12.3 | 13.1 | 14.0 | 13.6 | 14.4 | 15.2 |
| PROPERTIES | | | | | | | | | | | |
| CTE × $10^{-7}$/° C. | 4.2 | 3.7 | 16.8 | 5.3 | 10 | 6.5 | 5.7 | 8.0 | 6.2 | 6.7 | 8.6 |
| MOR (psi) | 3400 | 3100 | 6600 | 4000 | 4900 | 3700 | 4600 | 4900 | 2500 | 3400 | 3900 |
| Porosity | 26.8 | 28.0 | 26.1 | 28.2 | 27.2 | 29.3 | 26.9 | 27.4 | 35.0 | 32.0 | 37.0 |
| Effective Strength Index | 2945 | 2815 | 5915 | 3523 | 4301 | 3469 | 4029 | 4390 | 2986 | 3276 | 4162 |
| Minor phase: | | | | | | | | | | | |
| Type | Mull | Mull | Mull | Mull | Mull | Mull Sapph | Mull | Spinel | Mull | Sapph. | Spinel |
| Amount (wt %) | 2.0% | 7.5% | 35.4% | 6.3% | 15.8% | 6%/ 2% | 6.0% | 8.2% | 2.0% | 8.3% | 16.3% |

*Comparative Examples

An examination of Table I reveals that the inventive samples have comparable porosities and CTE's when compared to the standard cordierite compositions examples 1 and 9, however the inventive ceramic bodies exhibit increased strengths; i.e. they exhibit a greater effective strength. Compositions 1 and 9, included for comparison, are representative of standard cordierite compositions and, as such are comprised of a composition that falls outside the composition range as indicated by the oxide percents. Specifically, comparing example 1 with inventive examples 4–8 reveals that the inventive examples exhibit comparable porosities (26.8% v. 26.9% to 29.3%) and CTE's (all less than $10\times10^{-7}$/° C.) yet exhibit greater MOR's (3400 psi v. 3700 psi–4900 psi). Also, comparing example 9 with inventive examples 10 and 11 reveals that inventive examples 10 and 11 exhibit comparable porosities (35.0% v. 32.0% & 37.0%) and CTE's (all less than $8.6\times10^{-7}$° C.) yet exhibit greater MOR's (2500 psi v. 3400 psi & 3900 psi). In short, the standard cordierite ceramic bodies each exhibited an effective strength index of less than 3000, 2945 and 2815 respectively, a value which all of the inventive examples exceed.

Comparison example 2 demonstrates the principle that not only must the raw material amount be controlled to achieve the proper off-stoichiometric composition of the fired body, but also the specific combination of raw material types must be such that they ensure that the desired properties are achieved. Specifically, comparison example 2 which comprises the same batch composition as inventive example 4, except for the use of different talc raw material choices, demonstrates that the use of a talc raw material having a excessively high degree of platiness, as evidenced by a morphology index of 0.95, without the use a raw material which compensates for the lowered strength obtained by the use of this talc, results in a ceramic body having properties outside the scope of the invention. Specifically, although comparison example 2 exhibits a lowered CTE, $3.7\times10^{-7}$/° C., it exhibits a less than desired strength, 3100 psi, and an effective strength of less than 3000, specifically 2815.

Comparison example 3 is representative of a batch that exhibits a composition, that, in terms of weight percent lies outside the range of the invention. The resultant ceramic article possess too great of a mullite percent (35.4%) which produces a ceramic body, that although it exhibits a sufficiently high strength, 6600 psi, and an effective strength of 5915, it does so at the expense of a thermal expansion coefficient, $16.0\times10^{-7}$/° C. that is too high.

We claim:

1. A ceramic article comprising a sintered phase composition, by weight of 65–95% cordierite and 5–35% of a secondary phase selected from the group consisting of mullite, magnesium-aluminate spinel, and sapphirine, a bulk analytical composition consisting essentially of about, by weight, 32–51% $SiO_2$, 35–49% $Al_2O_3$, 7–16% MgO and exhibiting a total porosity of not less than about 20%, by volume, a coefficient of thermal expansion no greater than about $15.0\times10^{-7}$/° C. over the temperature range of about 25° C. to about 1000° C., and an effective strength index greater than at least 3000.

2. A ceramic article in accordance with claim 1 wherein the article comprises at least 70% by weight, cordierite and the secondary phase is mullite.

3. A ceramic article in accordance with claim 1 which exhibits a coefficient of thermal expansion no greater than about $10\times10^{-7}$/° C. over the temperature range of about 25° C. to about 1000° C.

4. A ceramic article in accordance with claim 1 wherein the ceramic article comprises an extruded honeycomb configuration.

5. A ceramic article in accordance with claim 1 wherein the article exhibits a porosity greater than about 25%.

6. A ceramic article comprising a sintered phase composition, by weight, of 65–95% cordierite and 5–35% of a secondary phase selected from the group consisting of mullite, magnesium-aluminate spinel, and sapphirine, a bulk analytical composition consisting essentially of about, by weight, 32–51% $SiO_2$, 35–49% $Al_2O_3$, 7–16% MgO and falling within the ternary region designated by 1-2-3-4 of the ternary phase diagram of FIG. 1, and exhibiting a total porosity of not less than about 20%, by volume, and a coefficient of thermal expansion no greater than about $15.0 \times 10^{-7}/°$ C. over the temperature range of about 25° C. to about 1000° C., wherein the article exhibits an effective strength index greater than at least 3000.

7. A ceramic article comprising a sintered phase composition, by weight, of 65–95% cordierite and 5–35% of a secondary phase selected from the group consisting of mullite, magnesium-aluminate spinel, and sapphirine, having a bulk analytical composition consisting essentially of about, by weight, 32–51% $SiO_2$, 35–49% $Al_2O_3$, 7–16% MgO and exhibiting a total porosity of not less than about 20%, by volume and a coefficient of thermal expansion no greater than about $15.0 \times 10^{-7}/°$ C. over the temperature range of about 25° C. to about 1000° C., the raw material mixture utilized to form the ceramic article comprising a delaminated kaolin, a highly reactive alumina having an average particle size of less than 8 $\mu$m in diameter, and a calcined platy talc, wherein the article exhibits an effective strength index greater than at least 3000.

* * * * *